(12) United States Patent
Rudolph (10) Patent No.: US 9,439,076 B2
(45) Date of Patent: Sep. 6, 2016

(54) METHOD FOR INCORPORATING SUBSCRIBER IDENTITY DATA INTO A SUBSCRIBER IDENTITY MODULE

(71) Applicant: GIESECKE & DEVRIENT GMBH, Munich (DE)

(72) Inventor: Jens Rudolph, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/437,233

(22) PCT Filed: Oct. 16, 2013

(86) PCT No.: PCT/EP2013/003110
§ 371 (c)(1),
(2) Date: Apr. 21, 2015

(87) PCT Pub. No.: WO2014/063796
PCT Pub. Date: May 1, 2014

(65) Prior Publication Data
US 2015/0289140 A1    Oct. 8, 2015

(30) Foreign Application Priority Data

Oct. 22, 2012   (DE) ........................ 10 2012 020 690

(51) Int. Cl.
*H04B 1/3816*    (2015.01)
*H04W 12/10*    (2009.01)
(Continued)

(52) U.S. Cl.
CPC .......... *H04W 12/10* (2013.01); *H04B 1/3816* (2013.01); *H04W 8/205* (2013.01); *H04W 12/06* (2013.01)

(58) Field of Classification Search
CPC ... H04W 12/10; H04W 12/06; H04W 8/205; H04B 1/3816

USPC .......... 455/411, 557, 558, 432.1, 432.3, 446, 455/425, 461, 4.2; 705/50; 707/615, 619, 707/621, 623, 639, 657, 659, 788; 709/209
See application file for complete search history.

(56) References Cited

U.S. PATENT DOCUMENTS 7,706,791 B2    4/2010  Heutschi
8,381,235 B2 *  2/2013  Chafer .................... H04L 67/02
                                                            715/234

(Continued)

FOREIGN PATENT DOCUMENTS

EP    2182750 A1    5/2010
EP    2530960 A1   12/2012

(Continued)

OTHER PUBLICATIONS

German Search Report for corresponding German Application No. 102012020690.9, Jun. 11, 2013.

(Continued)

*Primary Examiner* — Kamran Afshar
*Assistant Examiner* — Farid Seyedvosoghi
(74) *Attorney, Agent, or Firm* — Workman Nydegger (57) ABSTRACT

A method for incorporating subscriber identity data into a subscriber identity module involves the subscriber identity module being incorporated in ready-to-operate condition in an end device. The subscriber identity module is arranged to manage a plurality of subscriber identity data and to receive subscriber identity data, and the subscriber identity data is stored in a file system. The method includes receiving a load command from a subscriber identity data management in the subscriber identity module; preparing the file system in the memory area of the subscriber identity module for storing subscriber identity data; receiving subscriber identity data in the subscriber identity module; storing the subscriber identity data in the prepared file system; and checking the data integrity of the received subscriber identity data by the subscriber identity module.

14 Claims, 4 Drawing Sheets

(51) Int. Cl.
*H04W 8/20* (2009.01)
*H04W 12/06* (2009.01)

(56) References Cited

U.S. PATENT DOCUMENTS

| | | | |
|---|---|---|---|
| 8,718,711 B2 * | 5/2014 | Shi | H04L 61/20 370/328 |
| 8,880,038 B2 * | 11/2014 | Bramwell | H04W 8/04 370/401 |
| 2004/0176092 A1 | 9/2004 | Heutschi | |
| 2013/0095795 A1 | 4/2013 | Shi | |

FOREIGN PATENT DOCUMENTS

| | | | |
|---|---|---|---|
| EP | 2538746 A1 | 12/2012 | |
| FR | WO 2005069660 A1 * | 7/2005 | H04W 88/02 |
| WO | 0235483 A1 | 5/2002 | |
| WO | 03009623 A1 | 1/2003 | |
| WO | 2009133410 A2 | 11/2009 | |
| WO | 2011036484 A2 | 3/2011 | |
| WO | 2011153714 A1 | 12/2011 | |

OTHER PUBLICATIONS

International Search Report for corresponding International PCT Application No. PCT/EP2013/003110, Mar. 18, 2014.

"3rd Generation Partnership Project; Technical Specification Group Services and System Aspects; Feasibility Study on the Security Aspects of Remote Provisioning and Change of Subscription for Machine to Machine (M2M) Equipment (Release 9)", 3GPP Standard, 3GPP TR 33.812, No. V9.2.0, Jun. 22, 2010, pp. 1-87.

* cited by examiner

METHOD FOR INCORPORATING SUBSCRIBER IDENTITY DATA INTO A SUBSCRIBER IDENTITY MODULE

BACKGROUND

This invention relates to a method for incorporating subscriber identity data into a subscriber identity module and to a subscriber identity module, with the subscriber identity module being incorporated in ready-to-operate condition in an end device, and the subscriber identity module being arranged to manage a plurality of subscriber identity data and to receive subscriber identity data.

Subscriber identity data serve for uniquely identifying and/or authenticating a subscriber in a communication network, for example a digital mobile radio network. Through said subscriber identity data it is possible for an operator of a communication network to associate the utilization of a service offered by the network operator, for example a speech and/or data service, uniquely with each subscriber in the communication network. Further, it is possible for the operator to enable network access, i.e. registration on the communication network, as soon as an authentication of the subscriber has taken place, or to refuse network access if an authentication of the subscriber is not possible.

Said subscriber identity data are located in a subscriber identity module (SIM). Each end device is usually equipped with such a subscriber identity module to enable utilization of services of the communication network. The subscriber identity module is integrated in ready-to-operate condition into an end device.

When a subscriber logs on to a communication network, it is ascertained by means of the subscriber identity data whether the subscriber is properly activated in the communication network and which services the subscriber may utilize in the network. A subscriber who is not uniquely identifiable or authenticatable is not authorized to utilize the services and is rejected by the network.

It is known to incorporate at least a first and a second set of subscriber identity data into a subscriber identity module, between which one can switch. Such subscriber identity modules are also designated dual IMSI, multi-IMSI and/or auto-roamer SIM. Such subscriber identity modules are personalized with said subscriber identity data accordingly in a secure production environment.

Future subscriber identity modules are to be arranged to be able to receive and employ further sets of subscriber identity data even after manufacture. This is generally designated subscriber identity data management, also subscription management. Here, a change between sets of subscriber identity data is decided at a time when the subscriber identity module is in use with the subscriber. Furthermore, the subscriber wishes to be able to utilize services via a further communication network, through which the generation of the accordingly required subscriber identity data is effected substantially later than the manufacture of the module. Thus, the subscriber identity module cannot be prepared for the new set of subscriber identity data during the personalization step upon manufacture.

SUMMARY

It is hence the object of the present invention to propose a method for incorporating subscriber identity data into a subscriber identity module, which is flexible and secure. In particular, said incorporating should be effected flexibly and securely during the utilization phase with a subscriber, after manufacture of the module.

In particular, the object is achieved by a method for incorporating subscriber identity data (or a set of subscriber identity data) into a subscriber identity module, with the subscriber identity module being incorporated in ready-to-operate condition in an end device, and the subscriber identity module being arranged to manage a plurality of subscriber identity data, i.e. several sets of subscriber identity data, and to receive subscriber identity data, with said subscriber identity data being stored in a file system. The method comprises the steps of: receiving a load command from a subscriber identity data management in the subscriber identity module; preparing the file system in the memory area of the subscriber identity module for storing subscriber identity data; receiving subscriber identity data in the subscriber identity module; storing the subscriber identity data in the prepared file system; and checking the data integrity of the received subscriber identity data by the subscriber identity module.

An end device as intended by the invention is in principle a device or a device component having means for communication with a communication network in order to enable utilization of services of the communication network. The term is to be understood for example to be a mobile end device such as a smart phone, a tablet PC, a notebook, a PDA. The end device can also be understood to include for example multimedia end devices such as digital picture frames, audio devices, television sets, e-book readers, which likewise have means for communication with the communication network. The term "end device" also includes for example any type of machine, automaton, vehicle, equipment having means, in particular mobile radio modems, for communication with the communication network.

A subscriber identity module as intended by the invention is quite generally a computer unit with a reduced overall size and range of resources and having a microcontroller and at least one data interface for communication with the end device. Said subscriber identity module has a secure memory area in which the subscriber identity data are securely incorporated in order to prevent attempted attempted tampering and/or abuse upon identification and/or authentication on the network. The subscriber identity module is operative by means of the end device, with the module being autonomous except for supply signals, such as supply voltage, clock, reset, etc.

The subscriber identity module is for example a chip card, also Universal Integrated Circuit Card (UICC) or SIM card, in a mobile communication network having the subscriber's machine-readable subscriber identification data stored on a chip. Such subscriber identification modules are operated by means of card reading units in an end device, and are in particular intended to be removable from the end device for the purpose of exchange or employment in a second end device.

Alternatively, the subscriber identity module is an integral part within the end device, for example a hard-wired electronic component. Such subscriber identity modules are also designated embedded UICCs (eUICCs). In this structural form said subscriber identity modules are not intended to be removed from the end device and can in principle not be easily exchanged. Such subscriber identity modules can also be configured as embedded Secure Elements, i.e. as secure hardware components in the end device.

Alternatively, the subscriber identity module is a Machine-to-Machine (M2M for short) module. Such modules are used for remote monitoring, remote control and remote servicing of end devices such as machines, plants and systems. They can alternatively also be employed for meter units such as electricity meters, hot-water meters, etc.

Alternatively, the subscriber identity module is configured as a software component in a trustworthy part of an operating system, a so-called Trusted Execution Environment (TEE) of the end device. The subscriber identity module is then configured for example within a secure runtime environment in the form of programs running therein, so-called trustlets.

Subscriber identity data as intended by the invention are, firstly, data that uniquely identify a subscriber in the communication network, for example an International Mobile Subscriber Identity (IMSI) and/or subscriber-specific data. The IMSI is the subscriber identity datum that is unique in a mobile communication network. It is composed of the country code MCC (Mobile Country Code), the network code MNC (Mobile Network Code) and a serial number that is assigned by the network operator.

Furthermore, subscriber identity data can be or comprise data that uniquely authenticate a subscriber on the communication network, for example an authentication algorithm, specific algorithm parameters, a cryptographic authentication key and/or a cryptographic Over-The-Air (OTA) key.

A load command from a subscriber identity data management is in particular an OTA command which is processed in the subscriber identity module. The command contains in particular the information that further subscriber identity data are to be loaded and already states parameters and structures of the further subscriber identity data, where applicable.

The step of preparing the file system in the memory area of the subscriber identity module for storing subscriber identity data serves to enable the subscriber identity data received at a later time to be stored in the existing file system. The step therefore involves the analysis of the file system for the existing structure and, where applicable, extension of the existing file system by further file system elements.

To enable further subscriber identity data (or a further set of subscriber identity data) to be loaded securely into the subscriber identity module, it must be ensured that this does not damage the existing file system and thus cause the module to lose its functionality. The method according to the invention and in particular the load command step in connection with the preparing step ensure that the further subscriber identity data can be stored in the subscriber identity module in the background and without influencing the activated subscriber identity data.

A subscriber as intended by the invention is for example a person who wishes to access services of the communication network by means of the end device. A subscriber is also understood to be an end device in an M2M environment.

A communication network as intended by the invention is technical equipment on which the transfer of signals takes place with identification and/or authentication of the communication partner, thereby offering services. The communication network is preferably built up in mobile radio cells. In particular, a mobile radio network is understood in this invention to be for example the Global System for Mobile Communications, GSM for short, representing the second generation, or the General Packet Radio Service, GPRS for short, or Universal Mobile Telecommunications System, UMTS for short, representing the third generation, or Long Term Evolution, LTE for short, representing the fourth generation.

A service as intended by the invention is in particular a speech service or a data service with which information and/or data are transferred via the communication network.

A plurality of subscriber identity data (or sets of subscriber identity data) means that the number of the subscriber identity data (or sets of subscriber identity data) on the subscriber identity module is not restricted. It is envisaged to provide thirty or more sets of subscriber identity data on a subscriber identity module in the future.

Preferably, the preparing will be effected by means of a remote file management. The file system and the incorporated applications of the module are administered by means of mechanisms such as Remote File Management (RFM) and Remote Applet Management (RAM). For this purpose, a logical channel is set up between the subscriber identity module and the subscriber identity management. The end device has no logical access to said channel, so that the remote file management tunnels the end device. Thus, the preparations of the file system can be effected without the received subscriber identity data influencing or impairing the functionality of the subscriber identity module with the activated subscriber identity data.

In particular, the preparing comprises extending the file system by at least one additional file system element, in particular a folder, with the subscriber identity data being stored in the additional file system element. The configuration of the additional file system element is dependent on the load command and the information contained therein about the further subscriber identity data. If the further subscriber identity data are to identify/authenticate the subscriber on a third-generation communication network, preparing the file system comprises in particular creating an additional folder, a so-called Application Dedicated File (ADF), in which said subscriber identity data are stored. Thus, the different subscriber identity data are stored in separated and structured form, with no access to the received subscriber identity data by the end device being effected at this time.

In a preferred embodiment, preparing the file system comprises creating a shadow directory at the level of the root directory in the file system of the subscriber identity module. The subscriber identity data are received in the shadow directory, with the end device having no access to the shadow directory at the preparing time. The subscriber identity data to be received are provided in particular for identifying/authenticating a subscriber on a second-generation communication network. Second-generation subscriber identity data must be incorporated into the root directory, i.e. the Master File Record (MF), of the file system, which means in principle that file system elements, in particular files and folders, of the activated subscriber identity data would be influenced and overwritten, thereby possibly mixing the activated subscriber identity data with the received subscriber identity data. This would make the subscriber identity module no longer operative for identifying/authenticating the subscriber. Creating a shadow directory parallel to the root directory advantageously prevents this, since the end device has no access to the shadow directory and the shadow directory is not selectable for the end device.

In a preferred embodiment, the file system comprises subscriber identity data templates for storing subscriber identity data. Said subscriber identity data templates can already be stored on the subscriber identity module before the load command is received. They can be already incorporated into the file system upon personalization. Since the received subscriber identity data can have a size of far more than 10 kByte, the templates can serve to accelerate and optimize the loading of further subscriber identity data, in that file system elements which must in principle be contained in all subscriber identity data are already incorporated in advance upon production of the module. The subscriber identity data to be received then either replace parts of the templates or supplement the templates by parameters that are individual to the subscriber identity data. Alternatively, the templates comprise complete shadow directories with corresponding file system elements, such as files and folders. The templates cause the data traffic to be reduced and the load time to be shortened. It is possible to pre-install a plurality of templates in the file system. The plurality of templates can be mutually different. Preparing the file system then comprises selecting a suitable template—adapted to the subscriber identity data to be loaded—for storing the received subscriber identity data.

In a preferred embodiment, the subscriber identity module obtains a switch command after the checking step, with the switch command causing the received and stored subscriber identity data to be activated. It is ensured here that a switch is not effected before the check, so that it is not possible to switch to incomplete and/or false subscriber identity data.

In an advantageous embodiment, the activating comprises renaming the root directory of the file system and renaming a shadow directory as the root directory of the file system, since the end device has no access rights to the shadow directories and furthermore the shadow directories are invisible to the end device, since they are disposed on the same level as the root directory. The respective renaming and subsequent restarting of the subscriber identity module cause the received subscriber identity data to be activated and the activated subscriber identity data to become inactive. Renaming is preferably effected as a result of a switch command from the subscriber identity management.

In a preferred embodiment, the checking step comprises computing a check sum over the received and stored subscriber identity data, wherein the check result indicates the integrity of the data when the computed check sum is identical to a received check sum. Thus, it is ensured that an activation of the subscriber identity data is only possible after complete loading of said subscriber identity data. Tampering with the subscriber identity data is thus reliably recognized.

In a preferred embodiment, the subscriber identity data are received in a TLV format. Since at the current time it is not standardized how the subscriber identity data, in particular the data for the authentication algorithm on the network, the PIN and PUK values, etc., are to be stored on the subscriber identity module, a data format that is interoperable for different operating systems on the module must be defined in order to store said data and enable them to be employed through the operating system. Such subscriber identities in text-length-value (TLV) format are received in the module by means of the Global Platform command STORE DATE.

Preferably, the received subscriber identity data are secured against spying out by means of a transport protection and/or a further check sum. In addition to the transport protection, an OTA encryption of the data is provided.

The basic idea of the invention additionally involves a subscriber identity module for identifying a subscriber in a mobile radio system by means of subscriber identity data which is incorporated in operative condition in an end device, wherein the subscriber identity module has: a data interface for receiving commands of an end device and/or of a subscriber identity data management; a central computing unit; and a memory area, with an operating system and a file system being stored in the memory area, and with the subscriber identity module being operative through the operating system. The subscriber identity module is characterized in that a plurality of subscriber identity data (or sets of subscriber identity data) are storable in the file system, with the file system being prepared, before the loading and storing of subscriber identity data, such that the subscriber identity data are storable in mutually separated parts of the file system.

In an embodiment of the invention, the activating of inactive subscriber identity data is effected by realizing links to files in the file system. Thus, files with the designation according to the ETSI specifications can be stored in the root directory, whereas the content of said files merely has a pointer (link) to a file. The file is then a file of the received subscriber identity data and is located in one of the additional file system elements.

Hereinafter the invention, or further embodiments and advantages of the invention, will be explained more closely with reference to figures, with the figures merely describing exemplary embodiments of the invention. Identical components in the figures are furnished with identical reference signs. The figures are not to be considered true to scale, as individual elements of the figures may be represented with exaggerated size or exaggerated simplicity.

BRIEF DESCRIPTION OF THE DRAWINGS

There are shown.

DETAILED DESCRIPTION OF VARIOUS EMBODIMENTS

Figure 1:
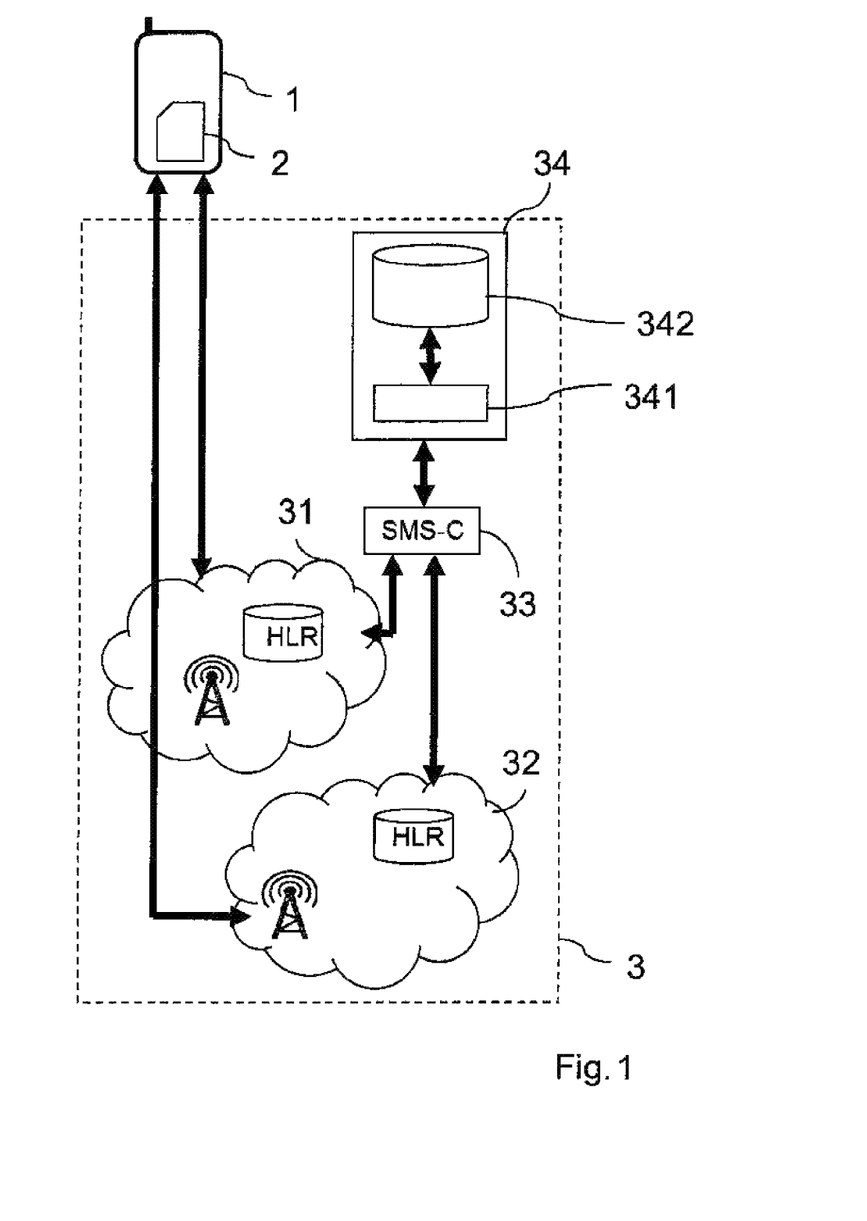
FIG. 1 a system for managing subscriber identity data according to the invention FIG. 2 a block diagram of a subscriber identity module according to the invention FIG. 3 a layered representation of the subscriber identity module according to the invention FIG. 4 a file system according to the invention for incorporating subscriber identity data into a subscriber identity module FIG. 5 a file system according to the invention that is alternative to FIG. 4

FIG. 1 shows a mobile radio system 3 for securely managing subscriber identity data 28. An end device 1 is equipped with a subscriber identity module 2. The construction of the subscriber identity module 2 will be explained more closely with reference to FIGS. 2 to 5. The mobile radio system 3 has a first mobile radio network 31 and a second mobile radio network 32. Additionally, a short message service center (SMS-C) 33 is contained in the mobile radio system 3. The SMS-C 33 is a component for transmitting messages/commands to the mobile radio end device 1. The SMS-C 33 acts as a gateway between a TCP/IP based communication and corresponding mobile radio protocols. The SMS-C 33 decapsulates a message within a TCP/IP protocol, thereby making the message into a classical mobile radio message, for example OTA-SMS. Said mobile radio messages can now contain load commands, switch commands, activation commands, deactivation commands and/or delete commands for managing subscriber identity data 28 within the subscriber identity module 2. The mobile radio networks 31, 32 are constructed classically, which is indicated by the symbolical representation of transmitting masts and an HLR. Further entities of the mobile radio networks 31, 32 have been omitted strictly for reasons of clarity. The system 3 further has a subscriber identity data management 34 with a subscriber identity data platform 341 and a subscriber identity data database 342.

For the normal operation of the module 2 let us assume that two sets of subscriber identity data are loaded in the module 2 in order to respectively identify/authenticate themselves on the first network 31 or on the second network 32. The subscriber identity data 28 of the first set of subscriber identity data are active, thus enabling the utilization of services on the first network 31. Now the user of the end device 1 (=subscriber) can change to the inactive subscriber identity data 28' of the second set of subscriber identity data to be able to utilize services of the second network 32. The change can be initiated in principle on the subscriber side, the end-device side or the network side. First, the inactive subscriber identity data 28' must be activated. Starting out from a network-side initiation, the second network 32 requests the activation of the inactive subscriber identity data 28' on the data management 34 via the gateway 33. By means of the platform 341 in connection with the database 342, the status of the individual module 2 is ascertained in the data manager 34, and the activating of the subscriber identity data 28' for the second network 32 prompted via OTA commands. After the activation the change of the subscriber identity data 28 from the first network 31 to the second network 32 is prompted by the platform 341. The module 2 is removed from the HLR of the first network 31 and entered into the HLR of the second network 32, represented by the arrows. The total communication between the networks 31, 32 and the module 2 is effected on the basis of OTA-encrypted channels, so that tampering with the communication is prevented. The OTA keys of the activated subscriber identity data 28 are always employed here, since the module 2 is only accessible via the activated subscriber identity data 28 via the mobile radio system 31. The status of the subscriber identity data 28 is monitored and managed by means of the platform 341. A corresponding updating of the database 342 is likewise effected.

If further subscriber identity data 28 are now to be supplied to the module 2, for example for identification on a third network (not represented here) of the mobile radio system 3, the procedure is as follows: According to the invention, it is assumed here that the further subscriber identity data 28 are already contained in the database 342. The platform 341 obtains the data 28 encrypted for the individual module 2 and makes them available to the module 2 via a secure channel. There the data are decrypted by means of a key individual to the subscriber identity module. This procedure is referred to as loading the subscriber identity data 28.

Figure 2:
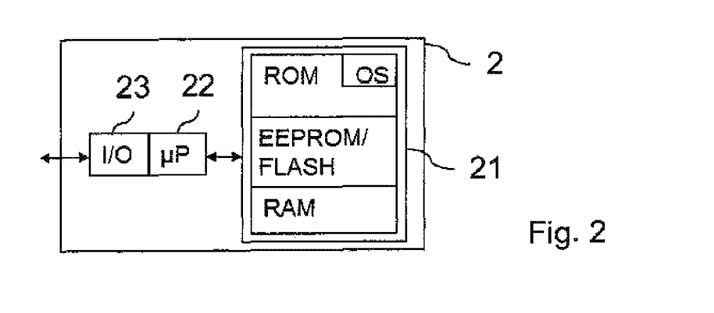

FIG. 2 represents a block diagram of a subscriber identity module 2. The subscriber identity module 2 has a data interface 23. A central computing unit 22 connects the data interface 23 to a memory 21 which can be configured as volatile (RAM) or non-volatile (ROM, EEPROM, FLASH). The subscriber identity data 28, 28' are stored in a changeable non-volatile memory area, for example EEPROM or flash. Therefore, the subscriber identity data 28, 28' can be adapted for the respective system 3 and in particular for an identification/authentication on one of the networks 31, 32. In particular, it is possible that the subscriber identity data 28 can be incorporated after the subscriber identity module 2 is issued to the subscriber, thereby enabling a more flexible use of the module 2.

Figure 3:
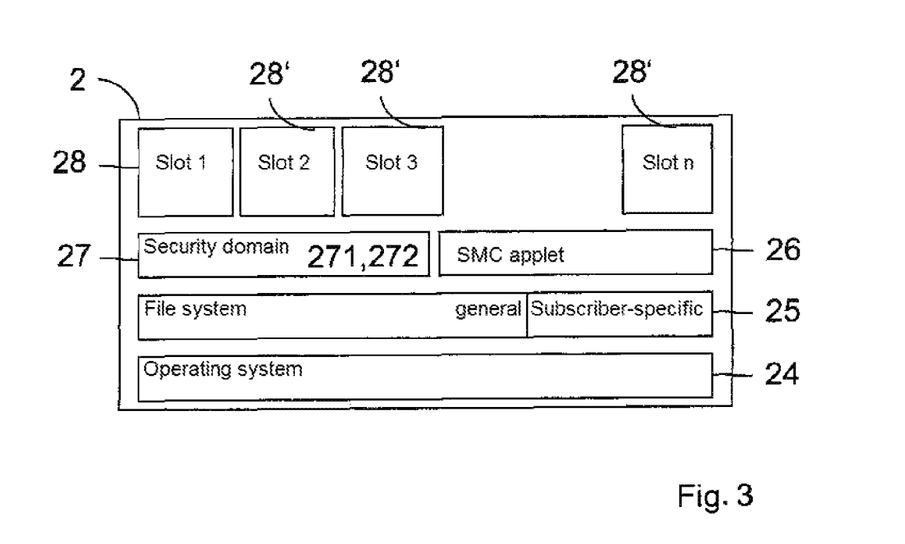

FIG. 3 represents a subscriber identity module 2 for employment in the method according to the invention. In the subscriber identity module 2 there is stored an operating system 24 with a general file system 25 linked therewith, the file system 25 being administrable via the operating system 24. The file system 25 is subdivided into a general file system and a subscriber-specific file system. The subscriber identity module 2 is equipped with a plurality of subscriber profiles. Each subscriber identity profile according to FIG. 3 contains subscriber identity data 28 which uniquely identify and/or authenticate a subscriber on the first and/or second mobile radio network 31, 32. The data 28 are individually addable, activatable, utilizable, deactivatable and also deletable. An administration of the data 28 is carried out by means of an application 26, referred to as SMC applet for short, incorporated in the subscriber identity module 2. The SMC applet 26 is in communication connection with the platform 341 of the data manager 34.

In a corresponding security region 27 there are incorporated keys individual to the subscriber identity module, a check sum algorithm 272 and a transport key. Said security region 27 is set up during the personalization of the module 2. The respective data 28 are loaded into the subscriber identity module 2 via the data interface 23, in particular as an Over-The-Air (OTA) message but also via Internet connection (Over-The-Internet, OTI for short). The subscriber identity data 28 have for this purpose OTA keys with which a secure channel with the platform 341 can be set up. It is to be noted that a communication via the mobile radio system 3 between the module 2 and the data manager 34 is possible only through the activated subscriber identity data 28.

Figure 4:
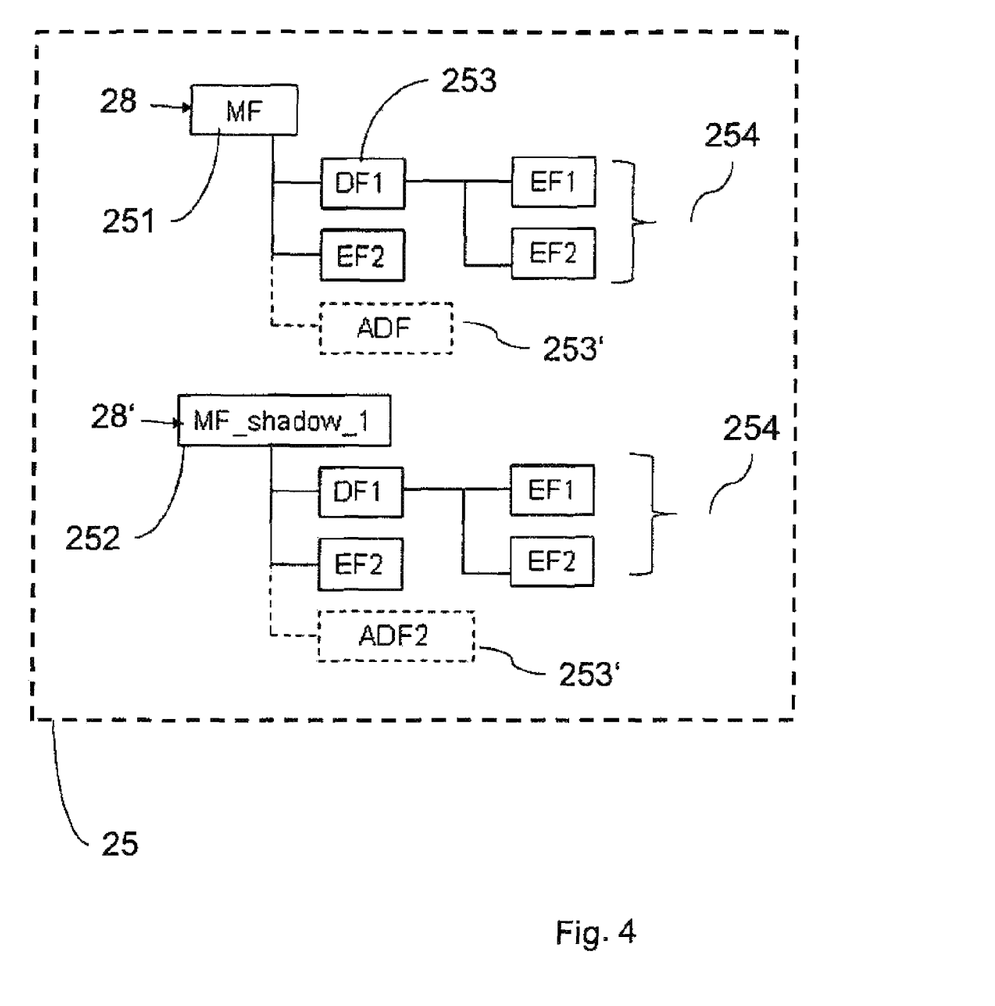

FIG. 4 represents a file system 25 according to the invention. The file system 25 has a master file (MF) 251 and a dedicated file DF1 as a folder 253. Hierarchically below, the DF1 has two elementary files EF1, EF2 which will hereinafter be designated files 254. The structure located below the MF 251 is visible to the end device 1, the end device 1 being able to access all folders 253 and files 254 within the MF 251. The files 254 and folders 253 located below MF 251 contain the activated subscriber identity data 28.

If it is now indicated by means of a load command that subscriber identity data 28' are to be loaded into the subscriber identity module 2 for a third-generation mobile radio network, the SMC 26 prompts the creating of an additional file system element, an application dedicated file ADF, hereinafter referred to as profile folder 253', in the course of preparing the file system 25 for the subscriber identity data 28' to be received. The profile folder 253' is drawn dashed to indicate that it had to be made or changed. The making of the profile folder 253' and the creating of files 254 within the profile folder 253' or also the adapting of files 254 or folders 253 outside the profile folder 253' in the course of receiving the subscriber identity data 28' is effected in particular by means of a remote file management 4.

FIG. 4 likewise shows how a file system 25 is prepared, after reception of a load command, to enable subscriber identity data 28' to be received for identification/authentication on a second-generation mobile radio network 31, 32. According to the invention, a shadow directory 252 is likewise created here by means of remote file management 4. The shadow directory likewise comprises DFs 253, EFs 254 and ADFs 253'. The shadow directory is created in the file system 25 at the same level hierarchically as the MF 251, being created in particular not below the MF 251. Thus, it is invisible to an end device 1, so that the shadow directory 252 cannot be accessed by the end device 1. The creating, adapting and storing of received data 28' is effected on the basis of the logical channel between subscriber identity management 34 and SMC 26.

When all data 28' have been received and a switch command is effected to the received subscriber identity data 28', the root directory 28 is renamed as a shadow directory 252 and the shadow directory 252 renamed as the root directory by means of remote file management 4. Subsequently, a restart of the module 2 is effected, for example by means of a refresh command. After the restart of the module 2 the end device 1 automatically accesses the "new" root directory and employs the data 28'. With the renaming, the inactive subscriber identity data 28' are activated and employed for authenticating/identifying the subscriber.

Since the files EF1 and EF2 of the DF1 10 have been updated, shadow files 11 of said files 10 exist as EF1* and EF2* which contain the original data contents 16 of the files 10 before updating, i.e. in the initial state of the file system 8. When a reset command 17 is effected via the mobile radio entity 7 or the internal end-device circuit 5a, said shadow files 11 are simply copied to the place of the corresponding updated files 10, thereby overwriting the updated files EF1 and EF2. Said reset 17 does not affect the EF1 and EF2 of the directory file DF2, since no shadow files have been created therefor. When DF1 and DF2 interact in some manner, it cannot be guaranteed by this reset method that the SIM 1 works properly.

Figure 5:
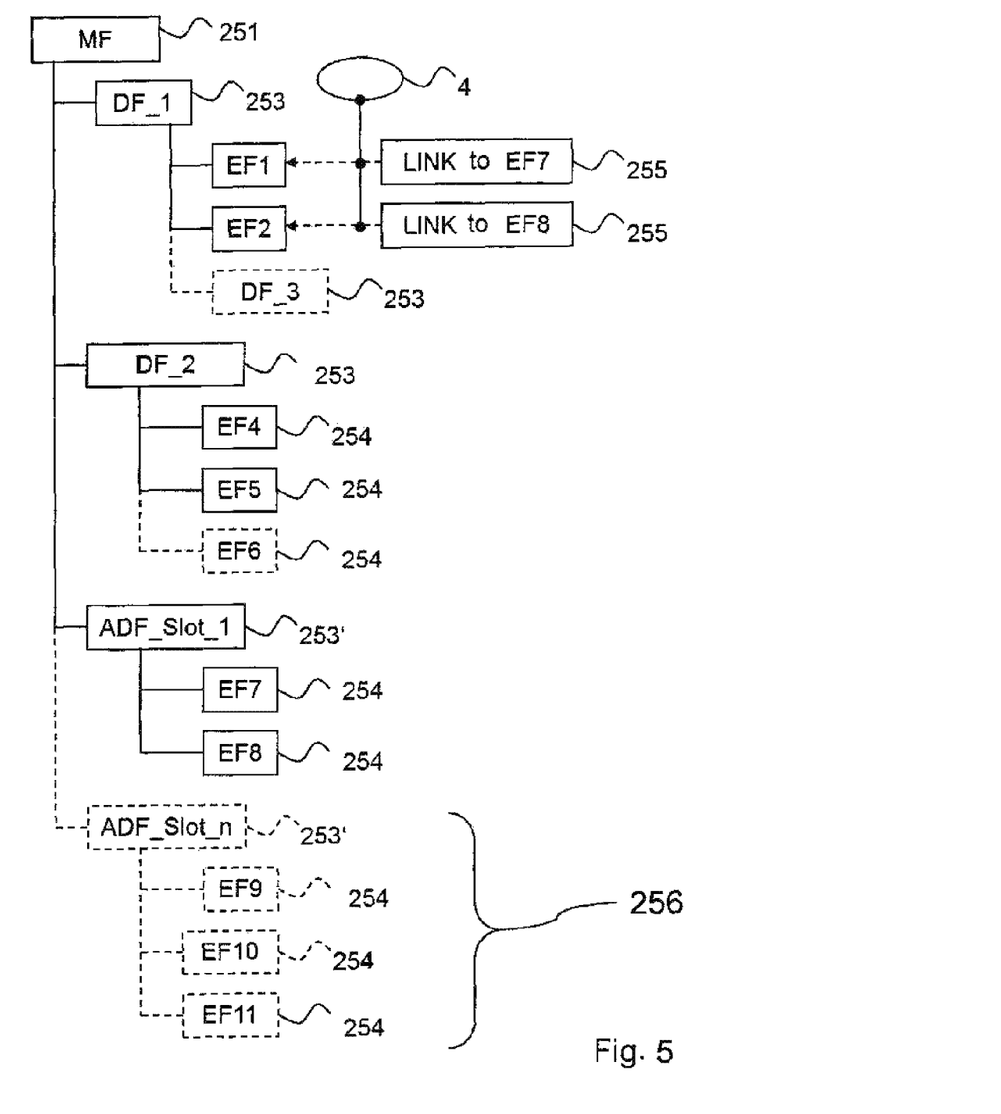

FIG. 5 represents an alternative file system 25 in which at least three sets of subscriber identity data 28, 28' are incorporated. Here, only the root directory 251 and a profile folder 253' are shown. To now activate the subscriber identity data 28' of the profile folder 253', the file 254 itself is not activated by means of remote file management 4, but rather the link 255 to a file 254 in the profile folder 253' merely written to the corresponding file 254 within the original file structure. For the end device 1 there is thus no change in the file system 25, the call-up of the file EF1 in the DF_1 leading to the file EF7 being pointed to, i.e. EF7 being executed instead of EF1. Respectively, the executing of the file EF2 leads to EF8 being executed.

FIG. 5 further represents a profile template 256 according to the invention. Said template 256 is already incorporated into the file system 25 during the first-time personalization of the subscriber identity module 2 upon manufacture. In so doing, files 254 and also folders 253 are created in the profile template 256. Upon receiving of the load command, the profile template 256 is now selected and prepared in accordance with the information from the load command. The subscriber identity data 28' to be received can thus have a low data volume, since files of the template can already be utilized, on the one hand, and only an updating of the file must be received and/or a delta (for example a surplus) of the subscriber identity data 28 must be received, on the other hand. In any case this reduces the network load for loading the subscriber identity data 28 and increases the load time.

The subscriber identity data 28 can in particular be separated into a variable portion of the subscriber identity data, which is individual to each set of subscriber identity data 28, and a static portion, which is the same for all sets of subscriber identity data 28. Accordingly, the profile folders 253' can already be prefabricated with the static portion.

As a variable portion of the subscriber identity data 28 there can be mentioned for example: the authentication algorithm (EF_AuthAlgo), the authentication constants (EF_AuthConst), the authentication parameters (EF_AuthPar), the authentication OPK (EF_AuthOPK), the ICCID (EF_ICCID), the IMSI (EF_IMSI), the SMSP (EF_SMSP), the FPLMN list (EF_FPLMN), the OTA keys (EF_OTA keys).

As a static portion of the subscriber identity data 28 there can be mentioned for example the employment of the files 254: EF_Loci; EF_LociGRPS; EF_Kc; EF_KcGPRS; EF_CPBCCH; EF_Keys; EF_PSLoci; EF_KeysPS. Said files 254 are set to a standard value by means of the SMC 26 and can hence in principle be already contained as a profile template 256 on the subscriber identity module 2 or be incorporated at a central location in the file system 25 to which the end device 1 again has access with the respectively activated subscriber identity data 28.

It is not represented that a cryptographic check sum is also sent. The check sum algorithm 272 checks the file system 25 or parts of the file system 25, after the complete receiving of the subscriber identity data 28, by computing a check sum. Subsequently, it compares the computed check sum with the transferred check sum. If the comparison yields that the two check sums are identical, the data integrity of the subscriber identity data 28' is proved, and the data 28' can be activated and employed.

The subscriber identity data are stored in the subscriber identity module 2 in the form of hierarchically structured file systems 25. All stored subscriber identity data 28, 28' are mutually separated to the greatest possible extent, so that a folder 253, 253' has a set of subscriber identity data 28, 28' associated therewith. It is conceivable to store all sets of subscriber identity data 28, 28' in a separate folder 253 and to consecutively number the sets of subscriber identity data 28, 28' accordingly.

The invention claimed is:

1. A method for incorporating subscriber identity data into a subscriber identity module, with the subscriber identity module being incorporated in ready-to-operate condition in an end device, and the subscriber identity module being arranged to manage a plurality of subscriber identity data and to receive subscriber identity data, and with said subscriber identity data being stored in a file system, comprising the method steps of:
   receiving a load command from a subscriber identity data management in the subscriber identity module;
   preparing the file system in the memory area of the subscriber identity module for storing subscriber identity data;
   receiving subscriber identity data in the subscriber identity module;
   storing the subscriber identity data in the prepared file system; and
   checking the data integrity of the received subscriber identity data by the subscriber identity module,
   wherein preparing the file system comprises creating a shadow directory at the same level as a root directory in the file system of the subscriber identity module, and the subscriber identity data are received in the shadow directory, with the end device having no access to the shadow directory at the preparing time.

2. The method according to claim 1, wherein the preparing is effected by means of a remote file management, and the preparing comprises extending the file system by at least one file system element and the subscriber identity data are stored in the additional folder.

3. The method according to claim 1, wherein the file system comprises subscriber identity data templates for storing subscriber identity data, and said subscriber identity data templates are already stored on the subscriber identity module before the receiving of the load command.

4. The method according to claim 1, wherein the subscriber identity module obtains a switch command after the checking step, with the switch command causing the received and stored subscriber identity data to be activated.

5. The method according to claim 4, wherein the activating comprises renaming the root directory of the file system, and the activating further comprises renaming the shadow directory as the root directory of the file system.

6. The method according to claim 1, wherein the checking step comprises computing a check sum over the received and stored subscriber identity data, and wherein the check result indicates the integrity of the data when the computed check sum is identical to a received check sum.

7. The method according to claim 1, wherein the subscriber identity data are received in a Text-Length-Value (TLV) format.

8. A subscriber identity module for identifying a subscriber in a mobile radio system by means of subscriber identity data, which is incorporated in operative condition in an end device, comprising:
   a data interface for receiving commands of the end device and/or of a subscriber identity data management;
   a central computing unit; and
   a memory area, with an operating system and a file system being stored in the memory area, and with the subscriber identity module being operative through the operating system;
   wherein:
   a plurality of subscriber identity data are storable in the file system, with the file system being prepared, before the loading and storing of subscriber identity data, such that the subscriber identity data are storable in mutually separated parts of the file system, and
   in preparing the file system, a shadow directory is created at the same level as the root directory in the file system of the subscriber identity module, and the subscriber identity data are received in the shadow directory, with the end device having no access to the shadow directory at the preparing time.

9. The subscriber identity module according to claim 8, wherein the end device has no direct access to a part of the prepared file system.

10. The subscriber identity module according to claim 8, wherein the file system already has subscriber identity templates in which the subscriber identity data are storable during a loading process of the subscriber identity data.

11. The subscriber identity module according to claim 8, wherein the shadow directory is created in the file system, and said shadow directory has inactive subscriber identity data, and wherein the shadow directory is renamed as a root directory for activating the inactive subscriber identity data.

12. The subscriber identity module according to claim 8, wherein the activating of inactive subscriber identity data is effected by realizing links to files in the file system.

13. The subscriber identity module according to claim 8, wherein the subscriber identity data have a check sum.

14. The subscriber identity module according to claim 8, wherein the subscriber identity data have at least partly a Text-Length-Value (TLV) format.

* * * * *